April 6, 1971 A. J. SARKA Re. 27,113

SHEET MATERIAL FORMING APPARATUS

Original Filed Dec. 6, 1965 4 Sheets-Sheet 1

INVENTOR.

BY ALBERT J. SARKA

Hoffmann and Yount

ATTORNEYS

SHEET MATERIAL FORMING APPARATUS

Original Filed Dec. 6, 1965 4 Sheets-Sheet 2

INVENTOR.
ALBERT J. SARKA
BY
Hoffmann and Yount
ATTORNEYS

SHEET MATERIAL FORMING APPARATUS

Original Filed Dec. 6, 1965 4 Sheets-Sheet 3

INVENTOR.
ALBERT J. SARKA
BY Hoffmann and Grant
ATTORNEYS

SHEET MATERIAL FORMING APPARATUS

Original Filed Dec. 6, 1965 4 Sheets-Sheet 4

INVENTOR.
ALBERT J. SARKA
BY
Hoffmann and Yount
ATTORNEYS

United States Patent Office

Re. 27,113
Reissued Apr. 6, 1971

27,113
SHEET MATERIAL FORMING APPARATUS

Albert J. Sarka, Fairview Park, Ohio, assignor to Harris-Intertype Corporation, Cleveland, Ohio Original No. 3,383,991, dated May 21, 1968, Ser. No. 512,576, Dec. 6, 1965. Application for reissue Feb. 19, 1970, Ser. No. 12,873
Int. Cl. B31b *1/14*
U.S. Cl. 93—58.2 25 Claims

Matter enclosed in heavy brackets [ ] appears in the original patent but forms no part of this reissue specification; matter printed in italics indicates the additions made by reissue.

*ABSTRACT OF THE DISCLOSURE*

*A pair of rotary cylinders define a material forming nip. The rotary cylinders have complementary die plates mounted thereon. The die plates have projecting means thereon which cooperate to simultaneously cut and crease sheet material as it is advanced therebetween. Means is provided for conveying and introducing the sheet material in a registered condition into the deforming nip, and feeding members are provided on the die plates to assist in advancing the sheet material through the nip and maintain the sheets in their registered condition.*

The present invention relates to a method and apparatus for forming material and, in particular, to a cutting and creasing method and apparatus wherein cylinders carrying cooperating material forming members rotate to effect cutting and creasing of material advanced through the nip defined by the cylinders.

The principal object of the present invention is the provision of a new and improved high-speed method and apparatus for cutting and creasing sheet material and wherein a sheet to be cut and creased is registered and advanced to rotating cylinders carrying a plurality of projecting members which rotate with the cylinders and engage the material and effect the cutting and creasing of the sheet material and feeding of the sheet material through the nip defined by the cylinders while maintaining the sheet properly registered.

A further object of the present invention is the provision of a new and improved method and apparatus for cutting and creasing sheet material and wherein a sheet to be cut is registered and advanced to rotating cylinders supporting die plates carrying a plurality of projecting members which rotate with the cylinders and engage the material and effect the forming of the material and wherein gripper means on one of the cylinders engages the leading edge of the sheet material and advances the sheet into the nip of the cylinders and releases the leading edge of the sheet immediately after the leading edge is introduced into the cylinder nip so that the sheet is then advanced by the projecting means on the die plates.

A still further object of the present invention is the provision of a new and improved cutting and creasing apparatus for cutting and creasing sheet material and wherein a sheet to be cut or creased is registered and advanced to rotating cylinders carrying a plurality of projecting members which rotate with the cylinders and engage the material to effect forming of the material, and wherein one of the cylinders supports gripper means for engaging the registered sheet at the leading end thereof and for carrying the leading end of the sheet into the nip defined by the cylinders and wherein the gripper means is released immediately after the delivery of the leading end of the sheet material into the nip so that the material may be delivered from the nip in a path other than the path of movement of the grippers.

Still a further object of the present invention is the provision of a new and improved high-speed apparatus for cutting and creasing sheet material and wherein a sheet having a printed image thereon and which is to be cut is registered and advanced to rotating cylinders carrying a plurality of projecting members which rotate with the cylinders and engage the material to effect cutting thereof, and wherein mechanically actuated grippers located in a gap in one of the cylinders and rotatable therewith grip the sheet at the leading edge of the sheet and advance the leading edge of the sheet through the nip defined by the cylinders and release the leading edge of the sheet immediately after introducing the leading edge of the sheet into the cylinder nip.

Another object of the present invention is the provision of cutting and/or creasing dies to be mounted on rotating cylinders and which dies comprise flexible plates having projecting elements thereon which cooperate to cut and crease the material as the cylinders rotate and wherein the dies include projecting feed elements which engage opposite sides of the material to effect feeding of the material upon rotation of the plates with the cylinders.

Still another object of the present invention is the provision of a new and improved cutting and creasing apparatus for cutting patterns in sheet material having a printed image thereon and wherein the pattern is cut into the sheet material by cooperating die plates carried by the rotating cylinders, and the sheet is registered prior to delivery to the cylinders so as to properly locate the printed image on the sheet, and wherein the cylinders are relatively adjustable and the dies are also adjustable on the cylinders so as to provide for proper cutting of the sheet material and registry of the pattern to be cut in the sheet material with the printed image on the sheet material.

Further objects and advantages of the present invention will be apparent to those skilled in the art to which it relates from the following detailed description of a preferred embodiment thereof made with reference to the accompanying drawings and in which.

The present invention provides an improved method and apparatus for forming material and, particularly, provides an improved method and apparatus for cutting and/or creasing material wherein cylinders carrying cooperating material forming portions rotate to effect the cutting and/or creasing of the material advanced through the nip defined by the cylinders. Certain features of the present invention are applicable to methods and apparatuses for cutting and/or creasing material in either web or sheet form. Moreover, the present invention finds particular utility in the cutting and creasing of cardboard sheets having an image printed thereon to form a box lank therefrom, with the printed image forming a label ackground, or other marking on the box.

Figure 1:
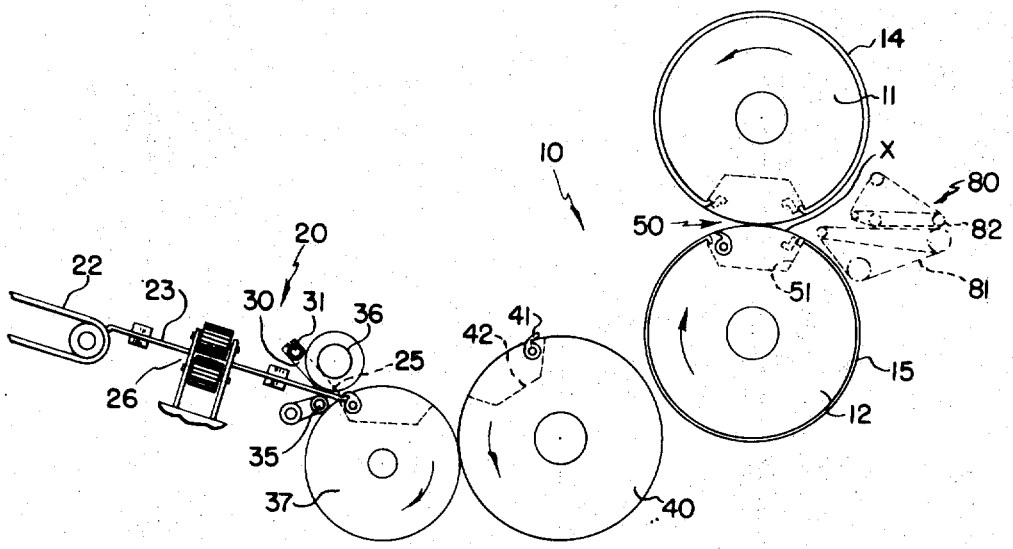
FIG. 1 is a schematic side elevational view of a cutting and creasing apparatus embodying the present invention.

Accordingly, as representing the preferred embodiment f the present invention, FIG. 1 illustrates a cutting and reasing apparatus 10 for cutting and creasing cardboard neets having a printed image thereon to form box blanks nerefrom. The cutting and creasing apparatus 10 is operble to cut and/or crease material and includes a pair f cylinders 11, 12 which rotate in close proximity and efine a nip therebetween. As material is advanced through ne nip defined by the cylinders 11, 12, it is cut and/or reased.

Figure 3:
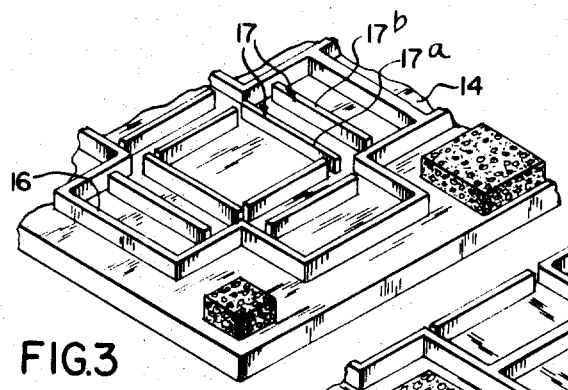
FIGS. 3 and 4 are fragmentary perspective views illustrating different portions of the apparatus of FIG. 1.

Cutting and/or creasing of the material is performed y sheet-forming elements carried by the cylinders 11, 12. he sheet-forming elements in the preferred embodiment re formed integrally with and project from flexible plates r dies 14, 15 carried by the cylinders 11, 12, respectively. he plate 14, as shown in FIG. 3, carries a plurality of rojecting forming elements, some of which, designated 5, constitute cutting elements, while others, designated 7, constitute creasing elements. The plate 15 carried by ne cylinder 12 and shown in FIG. 4 also includes a urality of cutting elements 18 and creasing elements 19 hich cooperate with the cutting and creasing elements n the plate 14 to effect cutting and creasing, respectively, the material advanced through the nip of the cylinders. he plates 14, 15 are flexible metal plates which may be adily curved to the circumference of the cylinders 11, 12 nd are secured thereon in a manner to be described reinbelow. The plates have sufficient flexibility so that hen removed from the cylinders 11, 12, they return to flat condition.

The plates 14, 15 have the cutting and creasing elements thereon formed integrally therewith and the cutng and creasing elements are in the form of projecting embers or lands which extend from a base portion of e plates 14, 15, respectively, and cooperate to effect the tting and creasing operation. The creasing and cutting ements are formed by etching the plates so that the easing and cutting elements project from the base porn thereof in a predetermined pattern. The pattern is ctated by the particular box blank being formed and ill vary from job to job.

Figure 4:
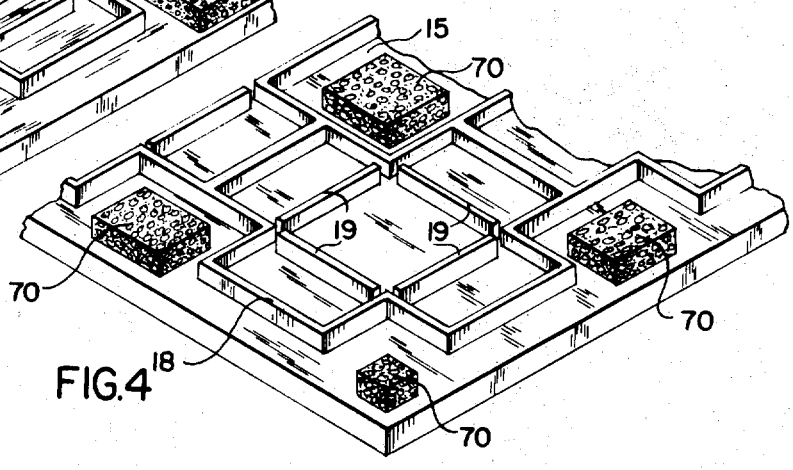
Figure 6:
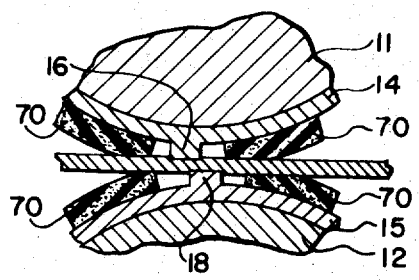
FIGS. 5 and 6 are fragmentary schematic sectional views of a portion of the apparatus of FIG. 1 illustrating operative positions thereof.
Figure 5:
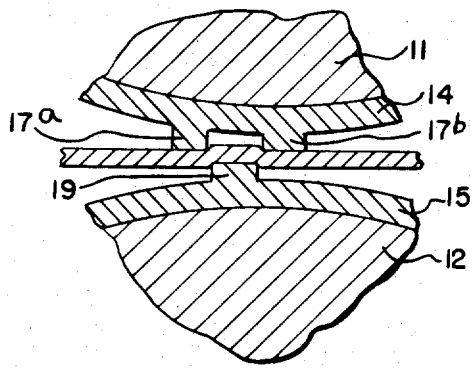
Figure 7:
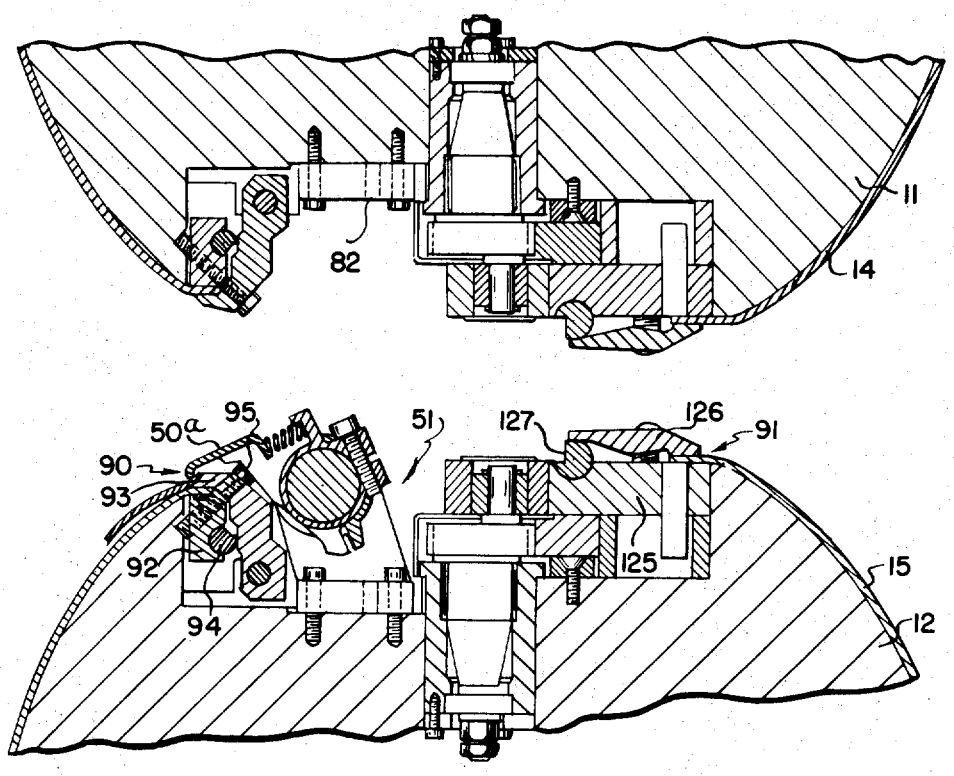
FIG. 7 is a fragmentary sectional view illustrating a further portion of the apparatus of FIG. 1.

The cutting lands 16, 18 cooperate upon rotation to fect cutting of the sheet material advanced between e cylinders 11, 12. The lands 16, 18 engage the sheet aterial, as best shown in FIG. 6, in a slightly overlapng relationship with each other, and extend through the eet material a substantial distance, but do not touch, nd effect a so-called ruptured cutting of the material. ne creasing elements 17, 19 cooperate to effect a creasg of the material as it is advanced through the nip of e cylinders 11, 12. The creasing elements comprise operating male and female members which cooperate crease the material advanced through the nip of the linders. The male members 19 are shown in the drawgs as carried by the plate 15, while the female members e shown as carried by the plate 14. The male members comprise projecting lands which project from the base rtion of the plate 15, as shown in FIG. 4. Each female easing member is shown as being carried by the plate 14 d constitutes a pair of spaced lands 17a, 17b. Sheet aterial advanced through the nip of the cylinders 11, 12 creased by the cooperative action of the male creasing ember 19 with the female creasing members 17a, 17b. best shown in FIG. 5, the male creasing member 19 effective to engage the material intermediate the female easing members 17a, 17b to effect a forcing of the mated between the female creasing members and thereby ect a creasing of the sheet material.

The ruptured cutting effected by the cutting lands 16, 18 d the creasing of the sheet material as effected by the nale and male creasing lands, are described in United ates patent to Downie, No. 3,142,233, issued by July 28, 64. The above-mentioned patent describes the particular dimensioning of these lands for carrying out the purposes of ruptured cutting and creasing, and the particular dimensioning of the lands in the present structure is the same as that disclosed in the Downie patent.

In the present embodiment, as noted hereinabove, the cooperating plates 14, 15 and, particularly, the sheet-forming members carried by the plates cooperate to rupture cut sheet material and to crease the sheet material as it is advanced between the cylinders 11, 12. The sheet-forming members, in particular, are arranged on the plates so as to cut a pattern into the sheet and in the specific embodiment shown, are arranged so as to cut a pattern for a box blank. In the preferred embodiment, the sheets are printed sheets and have a printed image thereon which is to take a predetermined position on the box, as a label, etc. Thus, the sheet material which is fed through the nip of the cylinders 11, 12 must be properly registered with the cutting patterns and creasing patterns on the plates 14, 15 so that the cutting of the sheet material takes place at the proper locations with respect to the printed image on the sheet material.

In order to ensure that the printed image on the sheet material is properly registered with the pattern of projecting lands on the plates 14, 15, the apparatus 10 includes a sheet registering mechanism, generally designated 20, for registering the sheet prior to delivery to the cylinders 11, 12. The sheet material to be delivered to the cylinders 11, 12 is advanced by a suitable conveyor 22 to a feedboard 23. The sheet is registered on the feedboard 23.

Figure 2:
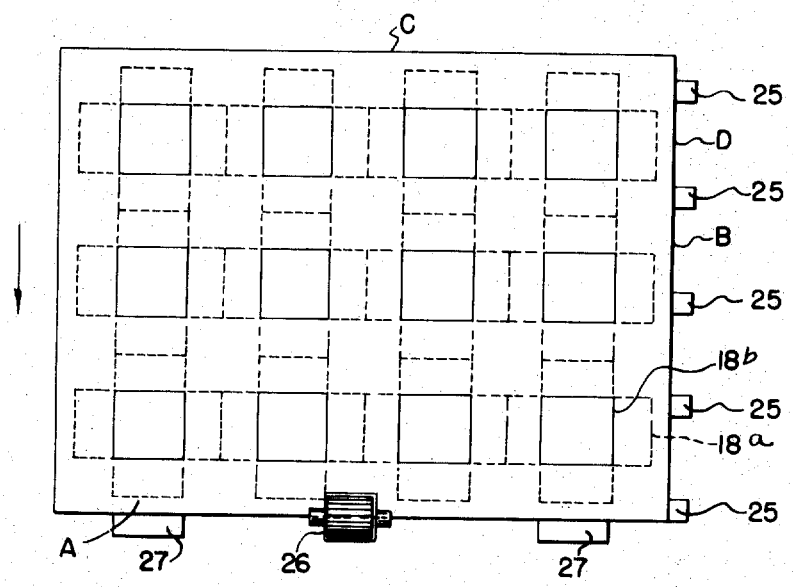
FIG. 2 is a schematic view illustrating sheet material in one operative position in the apparatus of FIG. 1.

A sheet having a sample plurality of printed images A thereon, designated by the dotted lines shown in FIG. 2, is shown in registered position so that the images A must be properly located with respect to the sheet-forming elements on the cylinders 11, 12 when the sheet arrives in the nip of the cylinders. The outline of the image A illustrated in FIG. 2 is shown in dotted lines 18a which comprise the lines to be cut by the cutting lands 16, 18, while the full lines 18b indicate the location where the sheet is to be creased by the creasing members 17, 19. The material of the sheet outside the images A becomes waste. It should be noted that the images A at the leading edge of the sheet are spaced somewhat from the leading edge B of the sheet, thereby providing an area D of the sheet which will eventually become waste.

The sheet is registered by front stops 25, shown schematically in FIG. 2, which move into the path of the leading edge B of the sheet and stop the sheet, thereby registering the leading edge of the sheet. A suitable side edge registry of the sheet is also effected by means of a pair of rollers 26 which move into engagement with the sheet and move the sheet laterally of the feedboard in the direction of the arrow shown in FIG. 2 so that the side edge C engages side lays or stops 27. The sheet is thus registered against the side lays for side registry purposes and is front registered against the front stops 25. The front stops 25 comprise the outer tips of arm members 30 which are supported for pivotal movement with a shaft 31. The shaft 31 when pivoted moves the stops 25 out of the path of movement of the sheet and a roller 35 moves into engagement with the underside of the sheet and presses the sheet against a roller 36 which cooperates therewith to effect feeding of the sheet toward an advancing cylinder 37.

The advancing cylinder 37 carries a gripper means 38 which engages the sheet and carries it with the cylinder 37. The gripper means 38 may be of any construction but preferably and as illustrated comprises a plurality of gripper fingers movable relative to a gripper post and which engage the sheet in the area D at the leading end thereof. The gripper means 38, once it has gripped the sheet, maintains the registry of the sheet and carries the sheet, upon rotation of the cylinder 37, to a sheet-advancing transfer cylinder 40. The transfer cylinder 40 also carries a gripper means 41 in a gap 42 in the cylinder. The gripper means 41 cooperates with the gripper means 38 upon rotation thereof to take the sheet from the gripper means 38 and yet maintain the registry thereof.

The gripper means 41, after it takes the sheet, rotates with the cylinder 40 and carries the leading edge of the sheet which is still maintained in registration toward the cylinder 12. The cylinder 12 carries means thereon for engaging the leading edge of the sheet and taking the sheet from the gripper means 41 carried by the cylinder 40 so that the sheet then travels with the cylinder 12. In the preferred embodiment, as shown in the drawings, the means for engaging and gripping the sheet at the leading edge thereof comprises a gripper means 50 which engages and takes the sheet from the gripper means 41 on the cylinder 40 and carries the leading edge of the sheet therewith upon rotation of the cylinder 12.

The gripper means 50 comprises a plurality of gripper fingers 50a which are supported in a gap 51 in the cylinder 12 and are movable to a gripping position to grip the sheet, and are movable to a release position to release the sheet. The gripper fingers 50a engage the sheet in the area B forward of the printed images A thereon are moved between their gripping and release positions by cam means in a manner well known. As should be readily apparent from FIG. 1, the gripper means 50 takes the sheet at the point where the cylinders 40 and 12 rotate in closest proximity and then introduces the leading edge of the sheet through the nip defined by the cylinders 11, 12. When the gripper means has advanced the leading edge of the sheet into the nip defined by the cylinders 11, 12, the gripper means 50 is released. This release occurs when the gripper means is approximately at location X as designated in FIG. 1. When the gripper means 50 releases the leading edge of the sheet, the sheet is thus no longer under the control of the gripper means and the gripper means proceeds to a position to engage the next sheet delivered to the cylinder to carry the next sheet into the nip defined by the cylinders 11, 12.

The sheet, after it is released by the gripper means 50, is advanced through the nip of the cylinders 11, 12 by cooperative projecting means on the plates 14, 15. The plates 14, 15 include, as noted above, a plurality of projecting members which deform the sheet material. These members, it has been discovered, may be effective to feed the sheet material through the nip without destroying the registration thereof. Whether or not feeding of the sheet in this manner occurs depends upon the force applied thereto by the projecting members. The creasing elements on the plates 14, 15 do provide a substantial feed force, while a lesser but effective feed force is applied by the cutting elements. Moreover, the feed force must be applied rather uniformly across the width of the material to ensure proper feeding without destroying the registry of the sheet. Thus, it should be obvious that the particular pattern on the plates 14, 15 will have an effect on the feeding of the sheet by the plates 14, 15.

In the present embodiment, the plates 14, 15 include projecting members 70 located on the plates in those areas where the forming members which form the material would be ineffective to feed the sheet material through the nip and maintain registry thereof. The projecting members 70 are of any suitable construction and preferably are made of a rubber material, such as sponge rubber, and are secured to the plates in any preferred manner, such as by adhesive, so as to engage the material with a slight pressure on the opposite side thereof and feed the material through the nip of the cylinders 11, 12. The projecting members 70 engage the material over a wide area and ensure and maintain the registration of the sheet while feeding the sheet through the cylinders. The projecting members 70 are positioned at spaced locations on the plates 14, 15 so as to provide the necessary driving force along with the sheet deforming members and generally are located where there are little or no creasing members to effect the feed. These particular members, however, rather than being of a rubber-like material, could be in the form of milled lands integral with the base portion of the plates 14, 15 and of substantial width and extent so as not to interfere with the proper operation of the cutting and creasing elements on the dies 14, 15, but yet provide for the feeding of the sheet through the nip.

It should be apparent, of course, that the leading edge of the sheet, as it leaves the nip of the cylinders 11, 12, does not tend to move with the cylinder 12 or the gripper means 50, but rather tends to move under the influence of the feeding elements carried by the plates 14, 15. The leading edge of the sheet, as it leaves the nip defined by the cylinders 11, 12, is engaged and supported by a suitable conveyor arrangement, designated 80. The conveyor arrangement 80 includes a suitable lower tape conveyor 81 which engages and supports the leading edge of the sheet for movement in a straight line substantially tangential to the cylinders at the nip thereof. An upper tape conveyor 82 cooperates with the lower tape conveyor 80 to guide the sheets from the cylinders 11, 12.

From the above description, it should be readily apparent that the construction of the apparatus 10 is such that registry of the sheet is maintained so that the sheet may be cut in the desired pattern in the desired locations on the sheet material with respect to the printed image thereon, and the registry of the sheet is maintained while the sheet is being delivered to the cylinders 11, 12 for cutting thereof. Also, it should be apparent that, once the leading edge of the sheet has been advanced into the nip of the cylinders 11, 12, it is released by release of the grippers 50 and the sheet is then maintained in registry and fed through the nip of the cylinders 11, 12 due to the projecting means on the plates carried by the cylinders, thus ensuring that proper registry of the sheet is maintained at all times and that the sheet is properly cut to provide the desired pattern and location of the pattern in relation to the printed image on the sheet material.

The apparatus shown in FIG. 10 is, of course, adjustable so as to cut different patterns on different size sheets and on sheets of different thicknesses. This necessitates, of course, adjustment and changes in the apparatus and, particularly, in the location of the sheet deforming elements carried by the cylinders 11, 12. For the cutting of different patterns on different sheet material, different flexible plates can be constructed and mounted on the cylinders 11, 12. The plate 14 is secured on the cylinder 11 by clamps located in a gap 82 in the cylinder 11, while the plate 15 is secured on the cylinder 12 by clamps located in the gap 51 therein. These clamps may be of any suitable construction but preferably are as shown and described in copending application, Ser. No. 488,349, filed Sept. 20, 1965.

The plate clamps for holding the plates 14, 15 on the cylinders 11, 12, respectively, are identical in construction and only the plate clamps for holding the plate 15 on the cylinder 12 will be described in detail. It should be understood, of course, that the specific construction of the plate clamps carried by the cylinder 12 is the same as that carried by the cylinder 11 and similar parts of these plate clamps are given the same reference numbers.

The plate clamps for the holding plate 15 on the cylinder 12 are, as noted hereinabove, located in an axially extending gap 51 in the cylinder 12. The plate 15 extends around the cylinder and its opposite ends terminate adjacent the opposite sides of the gap 51. A front edge plate clamp unit 90 is located at one edge of the gap 51 to clamp the forward edge of the plate 15 to the cylinder, while a trailing edge plate clamp unit 91 is located at the opposite edge of the gap 51 to clamp the trailing edge of the plate 15 to the cylinder 12.

The plate clamp unit 90 comprises a plurality of pairs of relatively movable plate clamping jaws 92 and 93 which are operable to clamp the leading edge of the plate 15 therebetween. Each jaw 93 is movable relative to its associated jaw 92 between open and closed positions to clamp the leading edge of plate 15 therebetween. Each .w 93 is biased to an open position away from the jaw 2 by compression springs, not shown, and may be moved › a closed or clamping position by rotation of a rod 4 which when rotated moves the jaw 93 between its pen and closed positions. Suitable means are associated ith the forward plate clamp 90 so as to provide for ıovement of the unit 90 circumferentially of the cylinder › as to cause the plate 15 to tightly engage the cylinder 2. This means is in the form of jackscrews 95, only ne of which is shown in the drawings, and which are ıreadedly engaged in a threaded opening in the jaw 3 and project through an aligned opening in the jaw 92. he jackscrews 95 each have a forward end or tip which held in abutting engagement with the bottom wall f a cutout portion of the cylinder 12. By turning the :rews 95, the forward ends thereof bear against the cut-ıt portion of the cylinder and cause the plate clamp nit 90 to move away from the adjacent side of the gap ›r adjustment of the plate 15 on the cylinder 12.

The rear plate clamp unit 91 which clamps the trailing de of the plate 15 to the cylinder 12 comprises a pair f relatively movable jaws or plate clamping members 25 and 126. The jaw 126 is rockable between an open ›sition and a closed position relative to the jaw 125. The .w 126 is moved between its open and closed positions ›on rotation of a rod 127. The jaw 126 is carried by ıe jaw 125 and the jaw 125, in turn, is slidably supported ›r movement in the gap 51 relative to the cylinder 12 ›r purposes of properly positioning and locating the late 15 on the cylinder 12 in a snug tight manner.

When it is desired to locate the die plate 15 on the /linder 21, the forward plate clamp unit 90 is moved to open position and the leading edge of the plate 15 positioned between the jaws 92, 93. The jaws have penings therein designated 130 and 131, see FIG. 8, and ıe plate 15 has corresponding openings which are adapted › be aligned with the openings 130, 131 in the jaw 93 f the plate clamp unit 90. Registration pins are inserted to the aligned openings in order to properly locate the late 15 relative to the plate clamp unit 90 on the cylinder 2. The leading edge of the plate is then clamped into ›sition and the gauge pins which are located into the ›enings 130, 131 may be removed therefrom. After the ading edge of the plate is clamped, the cylinder 12 is ›gged to rotate under pressure to a position until only ıe trailing edge of the plate 15 remains free. The trail-g edge of the plate is then inserted between the jaws 25, 126 of the plate clamping unit 91. The plate clamping ıit 91 is also provided with an opening 132 in the ›ntral jaw thereof and a gauge pin is adapted to be ıserted through the opening 132 and into an aligned ›ening in the plate 15. The rear plate clamp unit 91 then moved to its closed position to secure the plate 5 on the cylinder 12.

Figure 8:
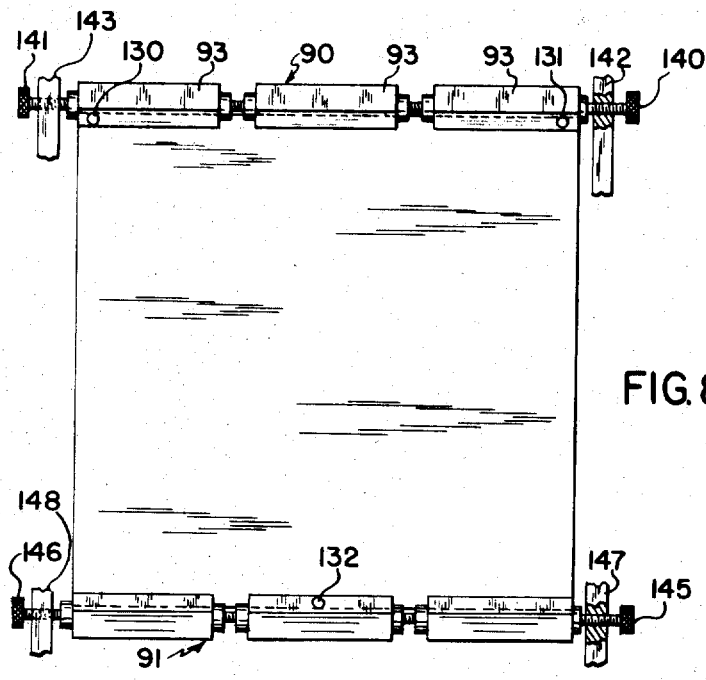
FIG. 8 is a schematic view illustrating parts of the apparatus of FIG. 1.

In view of the particular construction of the plates 4, 15, it is desirable to provide for adjustment of the ates 14, 15 on the cylinders 11, 12 so that the plates 4, 15 properly cooperate to effect the cutting and creas-g of the sheet material. If the plates 14, 15 are not ›operly adjusted, the cooperating projecting lands for ıtting and creasing of the material will not be effective ıd as a result, the plates will not operate as desired. o provide for adjustment of the plates, the plate clamp nits 90, 91 are adjustable axially of the cylinder 12. Any ljustment mechanism may be provided, and a suitable ljustment mechanism is shown schematically in FIG. 8. he adjustment of the plate clamp unit 90, as shown hematically in FIG. 8, is accomplished by means of a ıir of adjusting screws 140, 141 which are located at ›posite sides of the cylinder 12 and are threaded into ame portions 142, 143, respectively. The adjusting :rews 140, 141 bear against the opposite portions of the ate clamp units 90 and may be threaded into and out f the frame portions 142, 143 to effect axial movement thereof. The adjustment of the trailing edge plate clamp unit 91 is provided in a similar manner by a pair of adjusting screws 145, 146 which are threaded into frame portions 147, 148, respectively. The adjusting screws 145, 146 bear against opposite portions of the trailing plate clamp unit and may be threaded into and out of the frame portions 147, 148 to effect axial movement of the plate clamp unit 91.

Figure 9:
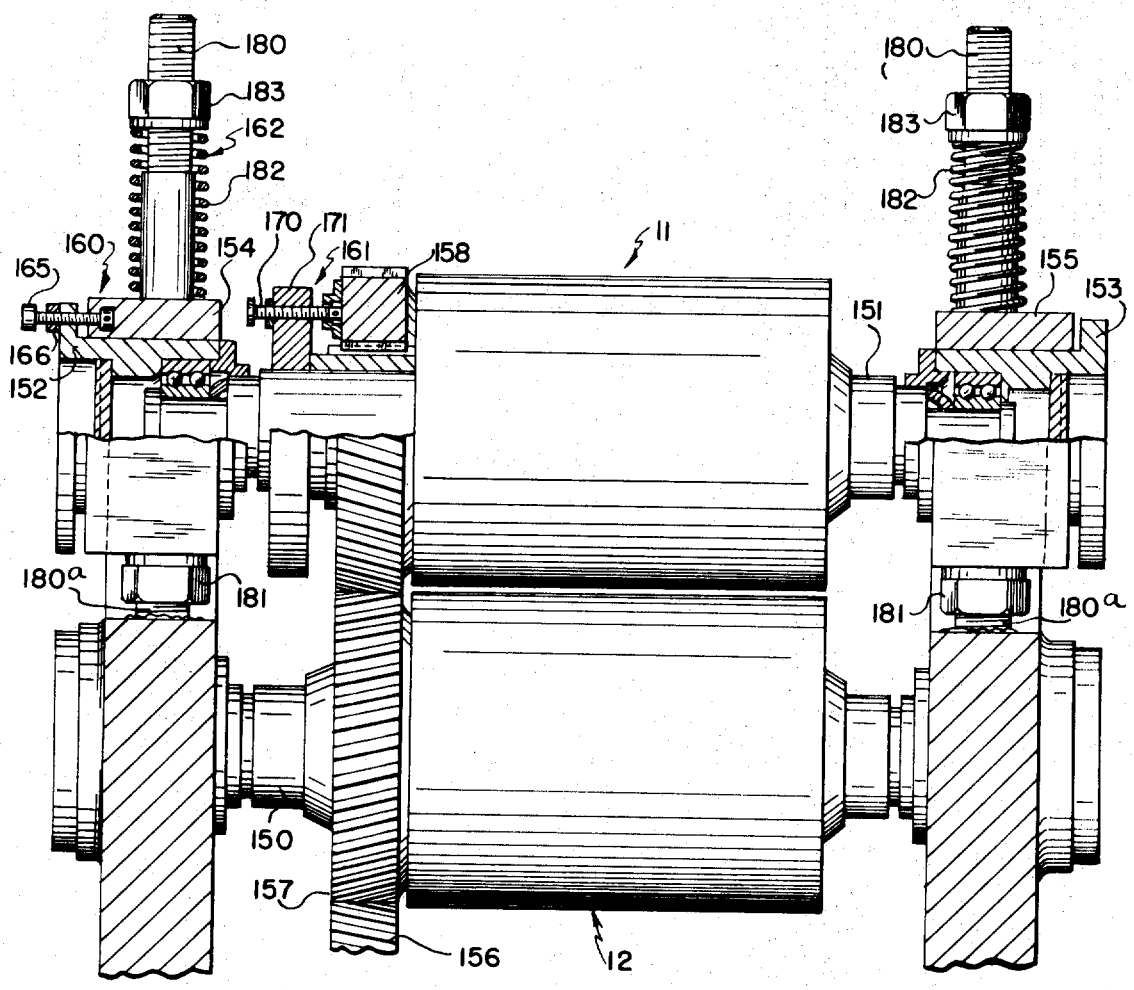
FIG. 9 is a view of the apparatus of FIG. 1 partially in elevation and partially in section.

From the above, it should be readily apparent that the plates 14, 15 may be adjusted somewhat on the cylinders 11, 12, respectively, by movement of the plate clamps. However, the adjustment of the plate clamp units is relatively slight and may be effected for providing the necessary alignment between the plates for proper cooperation with the cutting elements. However, where adjustment to a greater extent is necessary to effect proper alignment of the pattern of material forming members with the images A, as well as proper cutting and creasing, the apparatus may be adjusted by bodily moving one of the cylinders 11 or 12 with respect to the other. By way of example, the drawings illustrate that the cylinder 11 is adjustable relative to the cylinder 12. The cylinder 11 may be moved toward and away from the cylinder 12 in order to adjust the gap between the cylinders and adjust the nip therebetween. The cylinder 11 may also be moved axially relative to the cylinder 13 and thereby adjust the axial position of the plates thereon. The cylinder 11 may also be rotated relative to the cylinder 12 for adjustment purposes to properly adjust the circumferential location of the material forming elements on the cylinder 11 relative to the material forming elements on the cylinder 12. The particular construction and particular mounting of the cylinder 11 for such adjustment purposes is shown in FIG. 9 and is similar to the construction shown in copending application Ser. No. 266,308, filed Mar. 19, 1963, now abandoned.

Referring now to FIG. 9, which illustrates the cylinders 11, 12 without plates 14, 15, respectively, mounted thereon, the cylinder 12 is shown as secured to a shaft 150. The opposite ends of the shaft 150 are rotatably supported by suitable bearing assemblies. The cylinder 11 is secured to a shaft 151 which extends parallel to the shaft 150, and the opposite ends of which are rotatably supported by bearing assemblies 152, 153. The bearing assemblies 152, 153 are positioned in and supported by sleeve members 154, 155, respectively, for sliding movement relative thereto, for a purpose to be described hereinbelow. The cylinders 11, 12 are rotated in unison by a driving helical gear 156 which meshes with a helical gear 157 fixedly mounted on the shaft 150 and which, in turn, meshes with a helical gear 158 supported on the shaft 150, but nonrotatable with respect thereto. The gear 158 is splined to shaft 151 and is axially slidable therealong, for a purpose to be described hereinbelow.

As noted above, the cylinder 11 is adjustable relative to the cylinder 12. The adjusting mechanism for cylinder 11 includes means 160 for moving the cylinder 11 axially relative to the cylinder 12, means 161 for rotating the cylinder 11 relative to the cylinder 12, and means 162 for moving the cylinder 11 toward and away from the cylinder 12. The adjusting means 160 for moving the cylinder 12 axially preferably includes a screw 165 extending parallel to shaft 151. The left end of the screw 165, as viewed in FIG. 9, extends to the left beyond the bearing assembly 152 and is provided with a head so that a suitable tool, such as a wrench, may be used to rotate the screw. The other end of the screw 165 is provided with an enlargement thereon located in a groove in the sleeve member 154 which slidably supports the bearing assembly 152. The groove permits the enlargement to rotate relative to the sleeve member 154 but prevents any axial movement of the screws 165 relative to the sleeve member 154. The screw 165 extends through and is threadedly engaged in a threaded passageway in a projecting portion 166 of the bearing assembly 152.

It should be apparent from the above that upon rotation of the screw 165, the projecting portion 166 is moved along the screw 165 and the bearing assembly 152 moves. The bearing assemblies 152, 153 thus slide relative to the sleeves 154, 155, respectively, and the cylinder 11 is moved axially of the cylinder 12. A plurality of screws corresponding to screw 165 may be utilized, if deemed desirable.

The adjusting mechanism 161 for rotating the cylinder 11 relative to the cylinder 12 to effect the angular adjustment preferably comprises a screw 170 which extends parallel to shaft 151 and which is moved axially to effect the adjustment. The screw 170 threads into a collar 171 which is fixedly secured to the shaft 151 of the cylinder 11 and projects to the left outwardly beyond the collar, as the latter is viewed in FIG. 9. The inner end of the screw 170 is secured to the gear 158 which, as afore-mentioned, is slidably mounted on the shaft 151. The screw 170 is secured to gear 158 for rotation relative thereto and is held against axial movement relative thereto, and upon rotation, the screw 170 moves axially relative to the collar 171 and causes the gear 158 to slide axially along shaft 151 relative to the gear 157. Since the gears 158, 157 are helical gears, axial movement of the gear 158 relative to the gear 157 causes the gear 158 to be rotated, and rotation of the gear 158 causes rotation of the cylinder 11. This alters the angular relation between cylinders 11, 12 and the plates mounted thereon. The gear 157 does not rotate relative to gear 158 because driving gear 156 in mesh with gear 157 provides a resistance to such rotation. It should be apparent from the above description that a plurality of screws 170 may be used to move gear 158, if desirable.

To provide adjustment of the cylinder 11 toward and away from the cylinder 12, the sleeves 154, 155 which support the opposite ends of the shaft 151 for the cylinder 11 are each slidable on a pair of rod elements 180. The rod elements extend generally parallel to a line through and perpendicular to the axes of the cylinders 11, 12. The rod elements are fixed relative to cylinder 12 and are shown as having their ends 180a adjacent cylinder 12 welded to the frame. The sleeves 154, 155 engage nuts 181 threaded onto the rod elements and are urged to a position in engagement with the nuts by springs 182 disposed about the upper ends of the rod elements 180. The springs 182 each have one end abutting the adjacent one of the sleeve members 154, 155 and the other end abutting a stop provided by a washer which bears against a respective nut 183 threaded onto the outer end of the respective rod element. The cylinder 11 may be moved toward or away from the cylinder 12 along a path parallel to the rods 180 by adjusting the nuts 181, which causes movement of the sleeve members 154, 155, respectively, relative to the frame 10, and the force with which the cylinder 11 is held against the nuts 181 may be adjusting the nuts 183. The teeth of the helical gears 157, 158 are constructed so that there is sufficient play in the teeth in a radial direction to permit the desired amount of movement of the cylinder 11 without breaking the accurate intermeshing engagement of the gears.

From the above description, it should be readily apparent that applicant has provided a highly improved method and apparatus wherein projecting forming elements carried by rotatable cylinders cooperate to form the material and particularly cut and crease the material. The apparatus provided is particularly adapted to the cutting of material having a printed image thereon and which is registered prior to delivery to the forming elements. The forming elements are adjustable relative to each other so as to properly cooperate in order to effect the cutting and creasing operation at the desired locations relative to the printed image.

The present invention has been described hereinabove in considerable detail and it should be apparent that certain modifications, changes, and adaptations may be made therein by those skilled in the art to which it relates, and it is hereby intended to cover all such modifications, changes, and adaptations coming within the scope of the appended claims.

Having described my invention, I claim:

1. An apparatus for forming sheet material comprising a pair of rotary cylinders having complementary flexible die plates mounted thereon, said cylinders with the die plates thereon defining a sheet deforming nip therebetween, means for feeding sheets from a supply toward said rotary cylinders, a registering mechanism for registering said sheets with said die plates, means for conveying and introducing the sheets in registered condition into said deforming nip defined by said cylinders, and each of said die plates having projecting means thereon which cooperate to simultaneously deform and feed the sheets individually through said nip and maintain the sheets in registered condition as they pass through said nip.

2. An apparatus for cutting and creasing sheets having a printed image thereon comprising a pair of rotary cylinders having complementary flexible die plates mounted thereon, said die plates having a plurality of projecting members thereon defining a cutting pattern and cooperable to cut a sheet advanced therebetween, said cylinders with the die plates thereon defining a sheet deforming nip therebetween, means for feeding sheets having a printed image thereon from a supply toward said rotary cylinders, a registering mechanism for registering said sheets with said die plates to locate said sheets so that the printed image is aligned with the cutting pattern of said die plates when the sheets arrive at said nip, means for conveying and introducing the sheets in registered condition into said deforming nip defined by said cylinders, and each of said die plates having further projecting members thereon which cooperate to simultaneously deform and feed sheets individually through said nip and maintain the sheets in registered condition and at least some of which also deform the sheets as they pass through said nip.

3. An apparatus for cutting and creasing sheet material having a printed image thereon comprising a pair of rotary cylinders having complementary flexible die plates mounted thereon, said cylinders with the die plates thereon defining a sheet deforming nip therebetween, means for feeding sheets having a printed image thereon from a supply toward said rotary cylinders, a registering mechanism for registering said sheets with said die plates, means for conveying and introducing the sheets in registered condition into said deforming nip defined by said cylinders, said die plates having a plurality of projecting members thereon defining a cutting and creasing pattern and certain ones of which cooperate to cut and crease sheets advanced therebetween and feed the sheets individualy through said nip and maintain the sheets in registered condition as they are advanced through said nip.

4. An apparatus for cutting and creasing sheets comprising a pair of rotary cylinders having complementary flexible die plates mounted thereon, said cylinders with the die plates thereon defining a sheet deforming nip therebetween, means for feeding sheets from a supply toward said rotary cylinders, a registering mechanism for registering said sheets with said die plates, means for conveying and introducing the sheets in registered condition into said deforming nip defined by said cylinders, and each of said die plates having projecting cutting members cooperable to rupture cut sheets and projecting creasing members cooperable to crease sheets and feed the sheets individually through said nip and maintain the sheets in registered condition as they are advanced through said nip.

5. An apparatus for cutting and creasing sheet material as defined in claim 4 wherein said die plates include further non-sheet deforming projecting members having a feeding contact with the sheet over a substantial width of the sheet.

6. An apparatus for cutting and creasing sheet material as defined in claim 5 wherein said further projecting members on said die plates comprise resilient pads secured to said die plates in areas spaced from said projecting sheet deforming members and which engage the sheet over an area to effectively feed the sheet through the nip.

7. An apparatus for cutting and creasing sheet material as defined in claim 4 wherein said means for conveying and introducing the sheets in registered condition into said deforming nip includes means carried by one of said cylinders and engageable with a sheet at the leading edge thereof to introduce the sheet into the nip and operable to release the sheet immediately after the leading edge thereof is advanced into said nip.

8. An apparatus for cutting and creasing sheet material as defined in claim 4 wherein said cylinders have axially extending gaps therein and further include plate clamps located in said gaps for securing said die plates on said cylinders, and said means for conveying the sheets comprises gripper means carried in the gap of one cylinder and operable to grip the leading edge of a sheet to advance the leading edge through said nip and then release the leading edge thereof.

9. An apparatus for cutting and creasing sheet material as defined in claim 8 further including means for guiding the leading end of a sheet in a straight path substantially tangential to the circumference of one of said cylinders after release by said grippers and while being advanced by the projecting means on said die plates.

10. An apparatus for cutting and creasing sheet material as defined in claim 8 further including means for bodily moving said cylinders for adjustment purposes and means associated with said clamping means for adjusting said die plates relative to said cylinders.

11. An apparatus for cutting and/or creasing sheets comprising a pair of cylinders having surface portions rotatable adjacent each other, said surface portions carrying complementary flexible die plates thereon defining a sheet deforming nip therebetween, a registering mechanism for registering sheets prior to their being advanced into said nip, means for conveying and introducing the leading edges of the sheets while in registered condition into said nip including means carried by one of the cylinders for engaging the leading edge of each sheet individually and for delivering the leading edge through said nip and operable to release the leading edge of the sheet upon being introduced into said nip, and each of said die plates having a plurality of projecting members thereon which cooperate to simultaneously cut and/or crease the sheet and feed the sheet through said nip and maintain the sheet registered as it passes through said nip.

12. An apparatus as defined in claim 11 wherein said means for engaging the leading edge of the sheet comprises mechanically actuated grippers which grip the leading edge of the sheet.

13. An apparatus as defined in claim 12 further including means for guiding the leading edge of the sheet in a substantially straight path away from said nip after release by said grippers.

14. An apparatus for cutting and creasing sheet material comprising a pair of cylinders having surface portions rotatable adjacent each other, said surface portions carrying complementary flexible die plates thereon defining a sheet deforming nip therebetween and having portions cooperable to effect cutting and creasing of the sheet material as it is advanced through the nip, a registering mechanism for registering a sheet prior to its being advanced into said nip, and means for transporting the registered sheet and introducing the leading edge of the registered sheet into the nip between the cylinders including means carried on one of the cylinders for engaging the leading edge of the sheet and for delivering the leading edge through said nip and operable to release the leading edge of the sheet upon its being introduced into said nip.

15. An apparatus for cutting and creasing sheet material comprising a pair of cylinders having surface portions rotatable adjacent each other, said surface portions carrying complementary flexible die plates thereon defining a sheet deforming nip therebetween, each of said die plates having a plurality of projecting members, certain ones of which cooperate to effect cutting and creasing of the sheet material as it is advanced through the nip, a registering mechanism for registering the sheets prior to their being advanced into said nip, and means for transporting the registered sheets and introducing the leading edges of the registered sheets into the nip between the cylinders including gripper means carried on one of the cylinders for gripping the sheet at the leading edge thereof and for delivering the leading edge through said nip and operable to release the leading edge of the sheet upon being introduced into said nip.

16. An apparatus as defined in claim 15 wherein said gripper means includes portions engageable with the opposite sides of the sheet at the leading end thereof and in advance of the portion of the sheet to be cut.

17. An apparatus for cutting and/or creasing material comprising a first die member having first and second projecting members thereon, a second die member having third and fourth projecting members thereon, said first and third projecting members comprising sheet severing elements in the form of narrow lands standing above the surface of the main body of the plate in shallow relief, said second and fourth forming members comprising sheet creasing elements in the form of narrow lands standing above the surface of the main body of the plate, said sheet severing elements being disposed on the respective plates so that a minor portion of a sheet severing element on one of said plates overlies a minor portion of a coacting sheet severing element on the other of said plates and said creasing elements being disposed so that certain of said creasing elements on one plate are located intermediate the creasing elements on the other plate when said elements operate to cut and/or crease respectively, and each of said dies including further projecting feed members standing above the surface of the main body of the plate and adapted to engage material advanced between the dies to effect feeding thereof.

18. An apparatus as defined in claim 17 wherein said feed members comprise resilient pads secured onto said dies in spaced relation to said projecting members.

19. An apparatus for cutting and/or creasing sheets comprising a pair of rotary cylinders having complementary flexible die plates thereon defining a sheet deforming nip therebetween and cooperable to effect cutting and/or creasing of the sheets advanced therebetween, means for feeding sheets toward said rotary cylinders, means for registering said sheets prior to entering said nip, means for conveying and introducing said sheets in registered condition individually into said nip, and said die plates including projecting feed elements for engaging the opposite sides of said sheets to effect feeding thereof through said nip.

20. An apparatus as defined in claim 19 wherein said die plates include further projecting elements for deforming the material and said projecting feed elements are spaced from said further projecting elements.

21. A method of cutting and creasing sheet material comprising the steps of advancing sheet material toward a pair of rotating cylinders defining a cutting nip and carrying flexible die plates having projecting members thereon, registering said sheet material prior to its entering said nip, engaging the leading edge of the sheet and conveying the registered sheet material into said nip defined by said cylinders, releasing the sheet after the leading edge thereof is advanced into said nip, engaging the opposite sides of said sheet with said projecting members carried by said die plates, and advancing the material through said nip by the engagement thereof by said projecting members.

22. A method of cutting and creasing a sheet comprising the steps of advancing a sheet from a supply toward a pair of cylinders carrying complementary flexible die plates having a plurality of projecting members which cooperate to effect cutting and creasing of the sheet material, registering a sheet prior to its entering said nip, engaging the leading edge of a registered sheet and transporting the leading edge of the registered sheet while maintaining registry thereof into the nip between the cylinders, releasing the leadging edge of the sheet after it has been introduced into the nip, cutting and creasing said sheet by engaging the opposite sides of the sheet with said projecting members, engaging opposite sides of said sheet with feed projections on said dies, and advancing the sheet through the nip by the engagement thereof by the feed projections.

23. A method of cutting and creasing a sheet as defined in claim 22 wherein the sheet has a printed image thereon and wherein said sheet is engaged forwardly of the printed image for feeding of the leading edge of the sheet into the cylinder nip.

24. A method of cutting and creasing a sheet as defined in claim 22 further including the step of guiding said sheet in a straight line path away from said nip.

*25. An apparatus for forming material comprising a first rotatable cylinder, a first die plate member mounted on said first cylinder, a second rotatable cylinder mounted adjacent said first rotatable cylinder and defining therewith a material-forming nip, a second die plate member mounted on said second cylinder, each of said first and second die plate members having a main body and projecting elements in the form of narrow lands standing above the surface of the main body of the respective die plate members in shallow relief, said projecting elements on said first and second die plate members cooperating to form material passing through said material-forming nip, and each of said die plate members including further projecting feed members standing above the main body of the respective die plate members to engage material advanced between the die plate members to effect feeding thereof.*

References Cited

The following references, cited by the Examiner, are of record in the patented file of this patent or the original patent.

UNITED STATES PATENTS

| | | | |
|---|---|---|---|
| 419,835 | 1/1890 | Crowell | 83—323 |
| 2,905,067 | 9/1959 | Shields | 93—58.3 |
| 3,190,194 | 6/1965 | Kirby et al. | 93—58.2 |

BERNARD STICKNEY, Primary Examiner